US00RE42583E

(19) United States
(12) Reissued Patent
Ahn et al.

(10) Patent Number: US RE42,583 E
(45) Date of Reissued Patent: Aug. 2, 2011

(54) BRUSHLESS DC MOTOR IN WASHING MACHINE

(75) Inventors: In Geun Ahn, Kyongsangnam-do (KR); Dong Beom Lee, Changwon-shi (KR); Jong Chul Bang, Changwon-shi (KR)

(73) Assignee: LG Electronics Inc., Seoul (KR)

(21) Appl. No.: 10/853,764

(22) Filed: May 26, 2004

Related U.S. Patent Documents

Reissue of:
(64) Patent No.: 6,396,190
Issued: May 28, 2002
Appl. No.: 09/588,219
Filed: Jun. 6, 2000

(30) Foreign Application Priority Data

Jun. 7, 1999 (KR) ..... 99-21012
Jun. 7, 1999 (KR) ..... 99-21013
Sep. 9, 1999 (KR) ..... 99-38256

(51) Int. Cl.
*H02K 1/28* (2006.01)
*D06F 37/40* (2006.01)

(52) U.S. Cl. ..... 310/261.1; 310/52; 310/156.26; 310/266; 310/67 R; 68/12.24; 68/140; 403/361

(58) Field of Classification Search ..... 464/900; 310/261, 52, 156.26, 218, 60 R; 29/598; 68/140, 133, 23.3, 23.7
See application file for complete search history.

(56) References Cited

U.S. PATENT DOCUMENTS 3,663,850 A * 5/1972 Phelon ..... 310/153
4,130,770 A * 12/1978 Wrobel ..... 310/67 R
4,315,343 A * 2/1982 Neroda et al. ..... 15/339
4,623,812 A * 11/1986 van de Griend ..... 310/268
4,631,771 A 12/1986 Anderson et al. ..... 8/158
4,712,035 A 12/1987 Forbes et al. ..... 310/269
5,266,855 A 11/1993 Smith et al. ..... 310/90
5,353,613 A 10/1994 Smith et al. ..... 68/23.7
5,528,092 A 6/1996 Ohta ..... 310/67
5,659,216 A * 8/1997 Bisantz ..... 310/156.26
5,737,944 A 4/1998 Nishimura et al. ..... 68/23.7
5,778,703 A 7/1998 Imai et al. ..... 68/12.02
5,996,379 A * 12/1999 Skrippek ..... 68/140
6,049,930 A 4/2000 Hisano et al. ..... 8/159
6,257,027 B1 * 7/2001 Imai ..... 68/12.12

FOREIGN PATENT DOCUMENTS

DE 4335966 * 4/1995
JP 61-236350 10/1986
JP 63-191872 12/1988
JP 7-178286 7/1995
JP 7-265578 10/1995
JP 8-317589 11/1996

(Continued)

*Primary Examiner* — Burton Mullins
(74) *Attorney, Agent, or Firm* — KED & Associates, LLP

(57) ABSTRACT

Brushless motor in a washing machine including a stator having a coil coupled to an upper frame, and a rotor having a lower frame entirely formed of a metal to cover an outer circumference and a bottom of the stator, a plurality of magnets fitted to an inside wall of the lower frame at fixed intervals opposite to the coil of the stator, and a support member formed as one unit with, and at a central portion of the lower frame coupled to a washing water shaft for transmission of a rotating force of the lower frame to the washing water shaft, thereby permitting smooth heat dissipation and drainage from the motor, and shortening a fabrication process and time period.

19 Claims, 7 Drawing Sheets

AMENDED

FOREIGN PATENT DOCUMENTS

| | | |
|---|---|---|
| JP | 9-261907 | 10/1997 |
| JP | 3053199 | 8/1998 |
| KR | 1993-0001259 | 1/1993 |
| KR | 1993-0022466 | 10/1993 |

* cited by examiner

FIG. 4
AMENDED
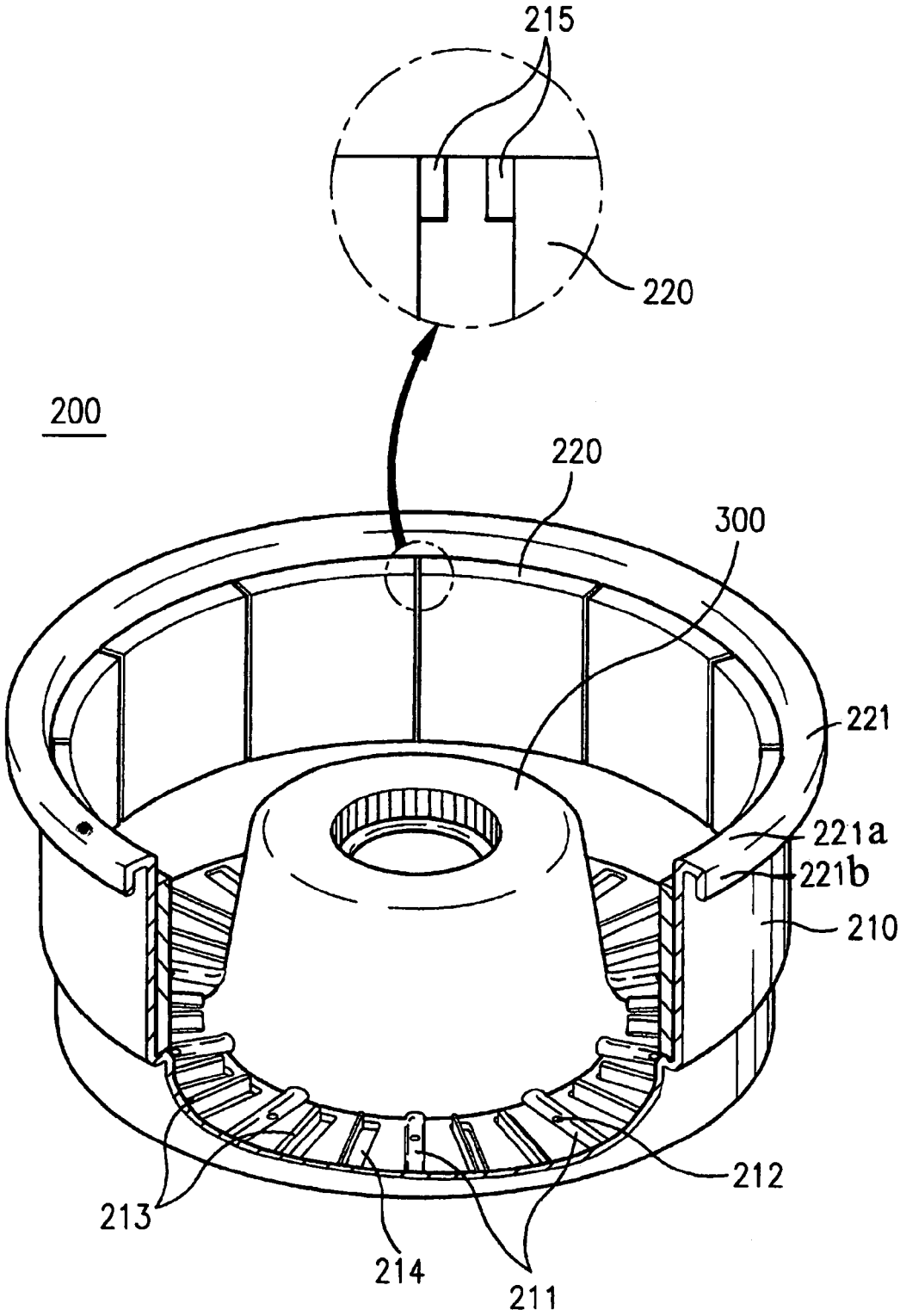

AMENDED
FIG. 5
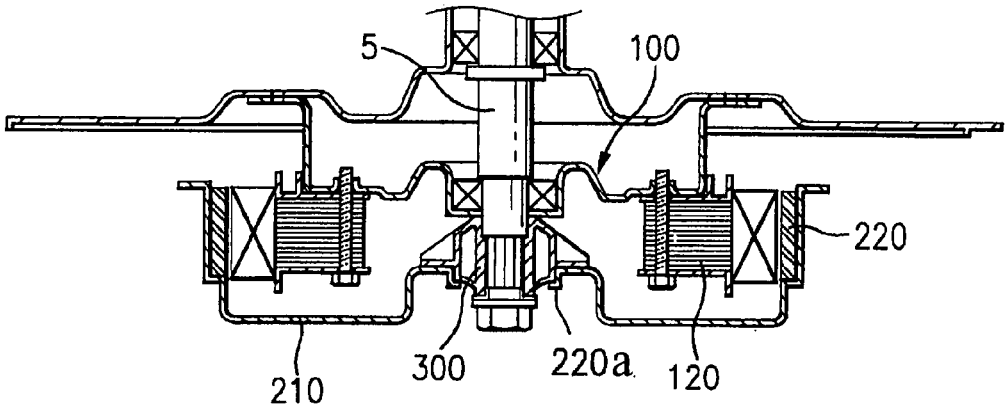

BRUSHLESS DC MOTOR IN WASHING MACHINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a washing machine, and more particularly, to a brushless motor for driving an inner tub or a pulsator in a washing machine.

2. Background of the Related Art

In general, the washing machine washes contaminated laundry clean by driving the inner tub or the pulsator by using a motor to circulate washing water having detergent contained therein. FIG. 1 illustrates key parts of a related art full automatic washing machine, provided with an inner tub 1, an outer tub 2, and a shaft 5 having one end connected both to the pulsator 3 fitted inside of the inner tub 1 and the inner tub 1 and the other end having serration 5a connected to a brushless motor 4. The brushless motor 4 designed to make regular and reverse rotation for driving the inner tub 1 and the pulsator 3 has a structure as shown in FIGS. 2 and 3.

That is, referring to FIG. 2, the brushless motor 4 is provided with a stator 10 having a coil 12 fitted to an upper frame 11 having a bearing 6 therein which is in turn fitted to the outer tub 2, and a rotor 20 having a lower frame 21 fitted to an outer circumference of the stator for being rotated by a polarity difference. As shown in FIG. 3, there are a plurality of magnets 22 fitted along an inside circumference of the lower frame 21 in the rotor 20 at fixed intervals, and a back yoke 23 between the magnets and the lower frame for forming a magnetic path and supporting the magnets. There are a plurality of draft holes 24 in a bottom surface of the lower frame. And, there is a support member 30 having female serration 31 along an inside surface injection molded as a unit with, or bonded to the lower frame 21 for transmission of a rotating power from the rotor to the shaft 5 having the male serration and maintaining a gap between the upper frame 11 and the lower frame 21.

The operation of the aforementioned system will be explained.

Upon application of a power to the brushless motor 4, the rotor 20 of the motor rotates in one direction by a polarity difference from the stator 10 and a flow of magnetic flux along the back yoke 23, to rotate the support member 30 coupled to the lower frame 21 of the rotor 20. According to this, the shaft 5 coupled with the female serration 31 inside of the support member 30 receives the rotating force of the rotor 20 through the support member 30 to rotate the inner tub 1 coupled to the shaft 5, thereby facilitating washing of the laundry.

However, the related art brushless motor has the following various problems caused by the structure.

First, the general plastic injection molded lower frame 21 in the rotor 20 of the related art brushless motor 4 impedes smooth dissipation of a heat generated during operation of the motor 4 to keep accumulation of the heat inside of the motor 4, that causes thermal distortion of the lower frame 21 and various components, and degrades the performance rapidly and shortens a lifetime of the motor. Moreover, the many steps required for injection molding of the rotor 20 in fabrication of the brushless motor 4 takes much time period, which drops a productivity, and the reinforcement required for the rotor 20 increases a total weight.

Second, the requirement for a separate device, such as a jig(not shown), for fitting the magnets 22 to the related art lower frame 21 at fixed intervals leads to a complicated fabrication process. That is, the fastening of the magnets 22 to the jig and winding the back yoke 23 therearound for fitting the magnets 22 to the lower frame 21 requires many fabrication steps, that causes many defects, to increase a production cost.

SUMMARY OF THE INVENTION

Accordingly, the present invention is directed to a brushless motor in a washing machine that substantially obviates one or more of the problems due to limitations and disadvantages of the related art.

An object of the present invention is to provide a brushless motor in a washing machine, which can prevent an internal heating, for making a stable operation.

Another object of the present invention is to provide a brushless motor in a washing machine, which can simplify the steps of process for fitting the magnets to a rotor.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the brushless motor in a washing machine including a stator havihg a coil coupled to an upper frame, and a rotor having a lower frame entirely formed of a metal to cover an outer circumference and a bottom of the stator, a plurality of magnets fitted to an inside wall of the lower frame at fixed intervals opposite to the coil of the stator, and a support member formed as one unit with, and at a central portion of the lower frame coupled to a washing water shaft for transmission of a rotating force of the lower frame to the washing water shaft.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 4 illustrates a perspective view of a lower frame in a brushless motor in accordance with a first preferred embodiment of the present invention;

FIG. 5 illustrates a section of a brushless motor having the lower frame in FIG. 4 applied thereto;

DETAILED DESCRIPTION OF THE PREFERRED EMBODIMENT

Reference will now be made in detail to the preferred embodiments of the present invention, examples of which are illustrated in the accompanying drawings. FIG. 4 illustrates a perspective view of a lower frame in a brushless motor in accordance with a first preferred embodiment of the present invention, and FIG. 5 illustrates a section of a brushless motor having the lower frame in FIG. 4 applied thereto.

Figure 1:
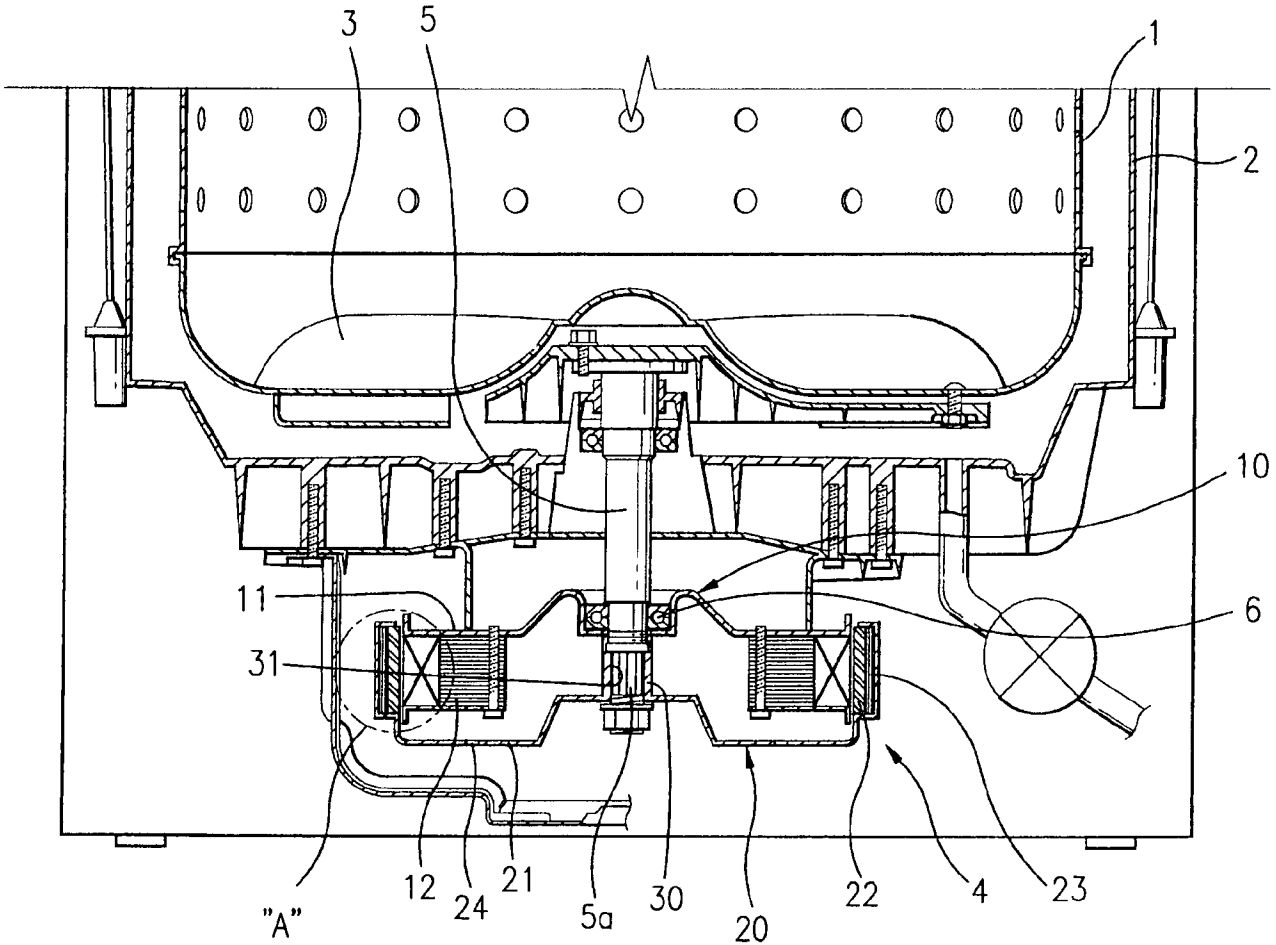
FIG. 1 Related Art
FIG. 1 illustrates a section showing a bottom system of a related art full automatic washing machine.
Figure 2:
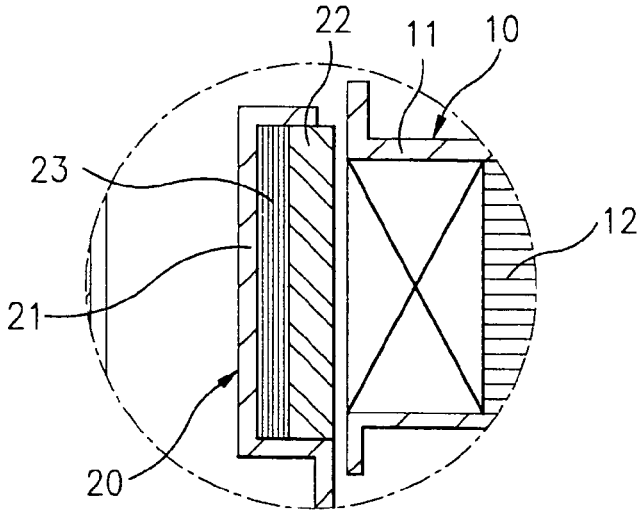
FIG. 2 Related Art
FIG. 2 illustrates an enlarged sectional view of "A" part in FIG. 1.
Figure 3:
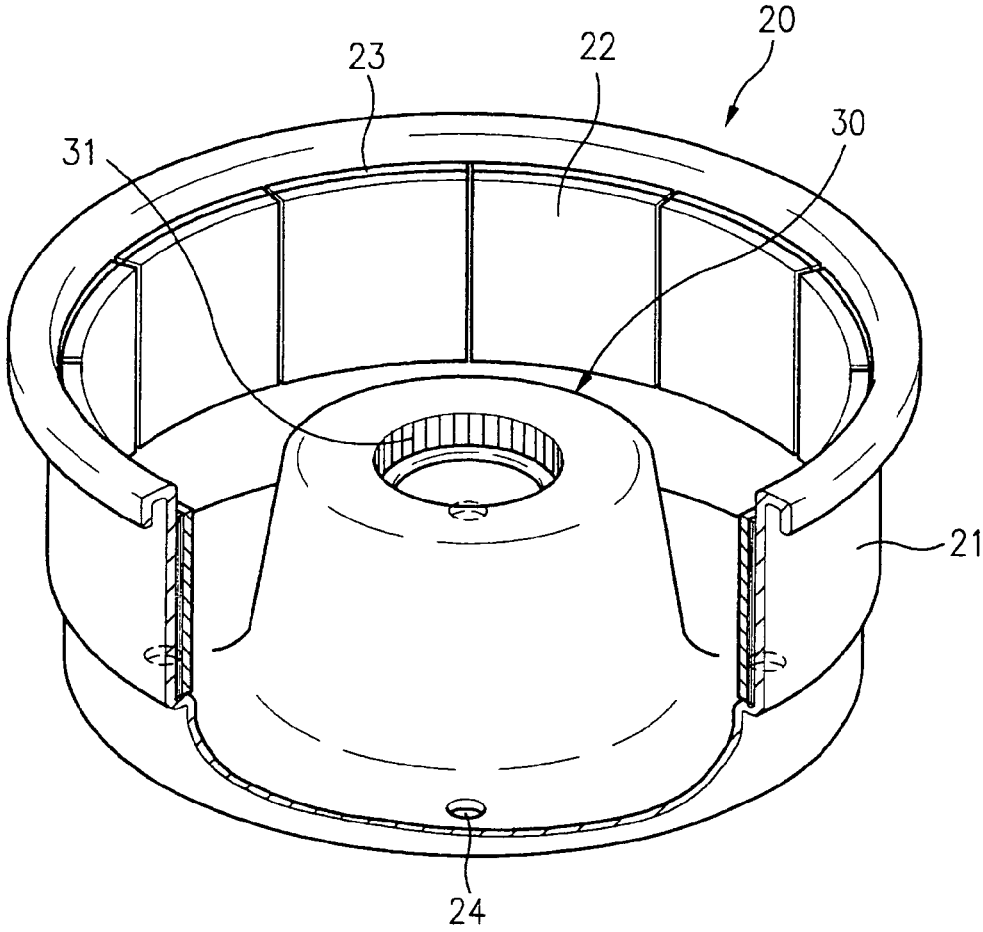
FIG. 3 Related Art
FIG. 3 illustrates a perspective view of a lower frame in a rotor of a brushless motor in a related art washing machine, with a partial cut away view.
Figure 6:
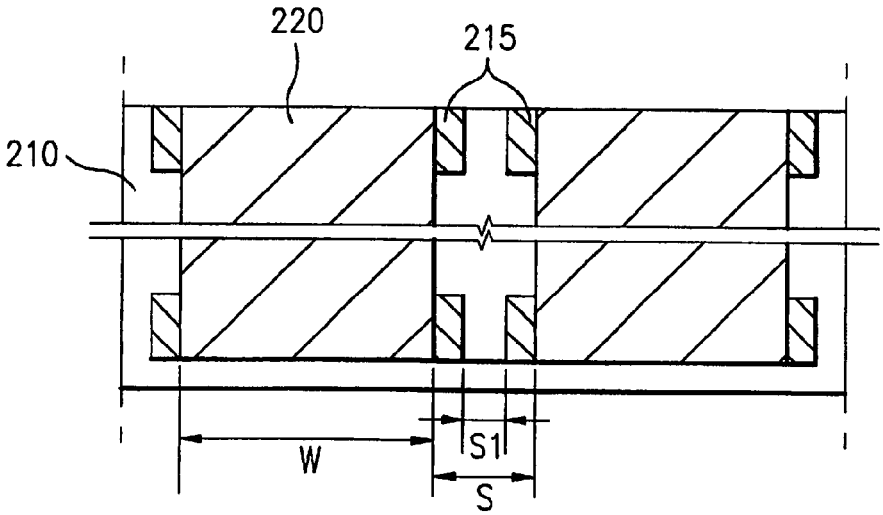
FIG. 6 illustrates a development of a lower frame to show magnets fitted to the lower frame of the present invention.

Referring to FIGS. 4 and 5, in the first embodiment of the present invention, there is a lower frame 210 of the rotor 200 formed by pressing steel plate *and having a lip 221 formed by first and second lip portions 221a and 221b*, a plurality of magnets 220 fitted at fixed intervals along an internal circumference of *a first portion 210a of* the lower frame 210 opposite to a coil 120 of the stator 100, and a support member 300 at a central portion *supported on a lip 220a* of *a second portion 210b of* the lower frame 210. The lower frame 210 of the rotor 200 is formed of steel plate, for smooth transmission and dissipation of a heat generated at the motor 4 to outside of the motor 4. And, by making the function of the back-yoke between the lower frame 210 and the magnet 220 to form a path of magnetic flux taken over by the lower frame 210, reductions of an overall fabrication steps and a number of components are made available. There are plurality of grooves 211 in a bottom of the lower frame 210 in a radial direction at fixed intervals along a circumference thereof for collecting the washing water leaked through the shaft 5 and accumulated on the bottom of the lower frame 210 to prevent short circuit between the lower frame 210 and the coil 120 of the brushless motor 4 caused by the washing water. There is a drain hole 212 in a bottom surface of the groove 211 for drain of the leaked washing water. There is a cooling fin between the grooves 211 in the lower frame 210 for smoother dissipation of the heat generated within the stator 100. The cooling fin 213 is formed in a radial direction with a length so that the cooling fin 213 can blow air toward the stator 100 when the rotor 200 is rotated for cooling the heat generated at the stator. The cooling fin 213 is formed by lancing, to bend the cooling fin 213 to be directed toward an upper side of the rotor 200 and form a draft hole 214 for dissipation of the heat from the stator. And, there are a plurality of projections 215 at fixed intervals along an inside circumference of the lower frame 210 for fixing intervals of the magnets 220 in fitting the magnets 220 thereto as shown in FIG. 6. These projections 215 permits to fit the magnets 220 with reference to the projections 215 on the inside surface of the lower frame 210 without the jig, for simplifying the fabrication process. Four of the projections 215 form a set, spaced by 'W' of a width of the magnet 220, to support four corners of the magnet 220, and the sets are formed such that there is a distance 'S1' between adjacent sets of the projections 215 to secure a distance 'S' between adjacent magnets 220. However, the projections are not limited to the above form, but may take various forms. That is, though not shown, it can be known with easy that, not only the four projections, but also two, or even one projection may form one set, for fitting the magnets 220 at the fixed intervals.

Though the lower frame 210 of the rotor 200 of steel plate in the first embodiment of the present invention permits, not only smooth heat dissipation of the heat from the motor 4, but also easy fitting of the magnets 220 on the lower frame 210, a property of the material causes a problem of short circuit. That is, once an insulation between the coil 120 of the stator 100 and the lower frame 210 of the rotor 200 are broken, a current flowed to the coil 120 flows to the lower frame 210, and, therefrom to the shaft 5 through the support member 300, and, eventually, to the inner tub 1 and the washing water in the outer tub 2, that may causes an accident. This is caused since the lower frame 210 and the support member 300 are formed of a conductive material as one unit. In a case the lower frame 210 and the support member 300 are formed of the same materials, a vibration caused by rotation of the rotor 200 is transmitted to the support frame 300 through the lower frame 210, and therefrom to the shaft 5. That is, since the materials are the same, the natural frequencies are the same, which allows direct transmission of the vibration occurred by the rotation of the lower frame 210 without attenuation, that results in complain from users as the vibration deteriorates a product reliability.

Figure 7:
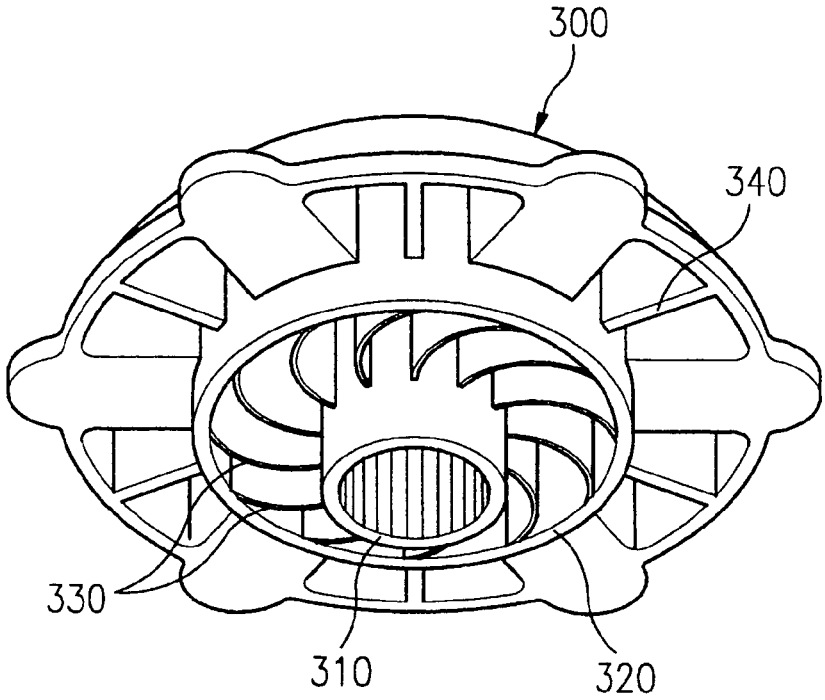
FIG. 7 illustrates a bottom perspective view of a support member in a brushless motor in accordance with a second preferred embodiment of the present invention.

Accordingly, the second embodiment of the present invention suggests to provide a support member 300 formed of an insulating material different from a material of the lower frame 210. That is, the support member 300 of the insulating material can prevent flow of the current flowed along the lower frame 210 to the shaft 5 through the support member 300, even if the insulation between the coil 120 of the stator 100 and the lower frame 210 of the rotor 200 is broken. Furthermore, the formation of the lower frame 210 and the shaft 300 of different materials differ natural frequencies, to attenuate a portion of the vibration transmitted through the lower frame 210 by the shaft 300. It can be known that the attenuation of the vibration to the shaft 5 permits a low noise operation of the washing machine. On the other hand, the formation of the support member 300 of the insulating material causes to require additional reinforcement of the support member 300. Accordingly, as shown in FIG. 7, there are additional radial ribs 330 formed between an inside circumference of a circular rib 320 on the lower frame and an outside circumference of the female serration 310, and additional reinforcing ribs 340 along an outer circumference of the circular rib 320, for preventing a problem caused by a drop of strength of the support member 300 in advance.

Figure 8:
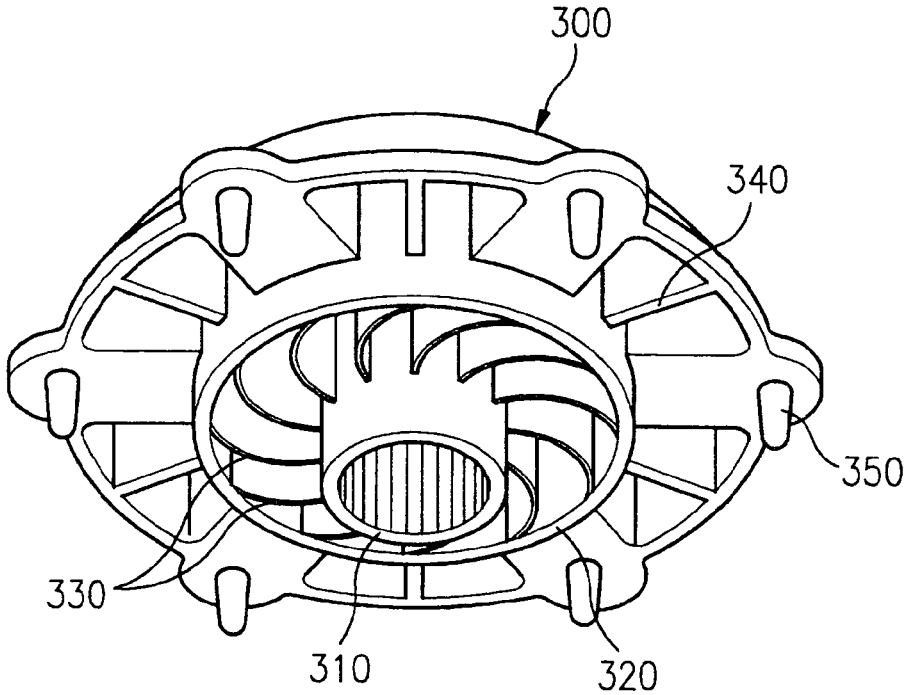
FIG. 8 illustrates a bottom perspective view of a first form of support member in a brushless motor in accordance with a third preferred embodiment of the present invention.
Figure 9:
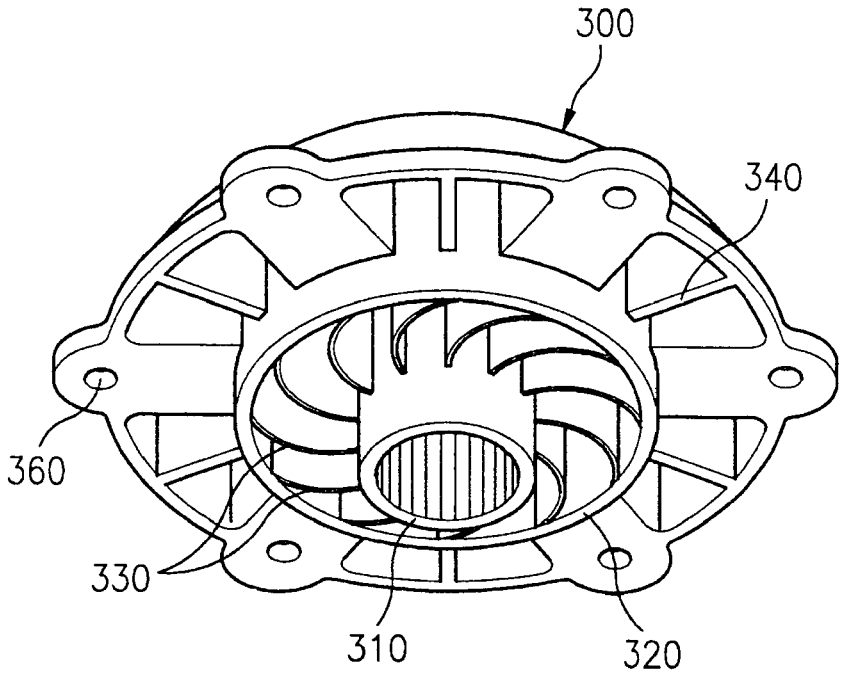
FIG. 9 illustrates a bottom perspective view of a second form of support member in a brushless motor in accordance with a third preferred embodiment of the present invention.

In the meantime, the formation of the lower frame 210 and the support member 300 of different materials may cause the fabrication process to form as one unit to require more steps. To cope with this, a third embodiment of the present invention suggests to form a support member 300 which can be coupled to the lower frame selectably, according to the following various methods. That is, as shown in FIG. 8, a plurality of downward coupling projections 350 are formed on a bottom surface of the support member 300, and a plurality of coupling holes 216 are formed in the lower frame 210, for accepting the coupling projections 350, respectively. This system permits an exact and stable setting of the support member onto the lower frame 210. Because, when it is intended to set the support member 300 onto the lower frame 210, the coupling projections can make a stable hold of the support member 300 in a process the coupling projection 350 on the support member 300 is accommodated into the coupling holes 216 in the lower frame 210. Or, as shown in FIG. 9, a plurality of fastening holes 360 may be formed both in a bottom surface of the support member 300 and a surface of the lower frame 210 opposite to the bottom surface, for fastening with fastening means, such as bolts 361 or rivets(not shown). This system provides a stable fastening of the support member 300 and the lower frame 210.

Figure 10:
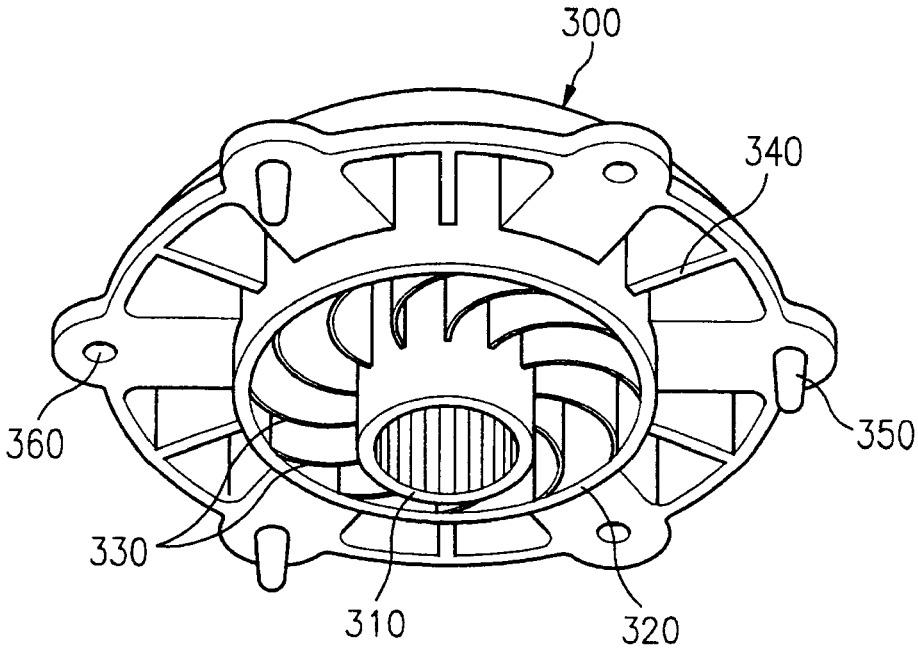
FIG. 10 illustrates a bottom perspective view of a third form of support member in a brushless motor in accordance with a third preferred embodiment of the present invention; and, FIG. 11 illustrates a section of a brushless motor having all the embodiments of the present invention applied thereto.
Figure 11:
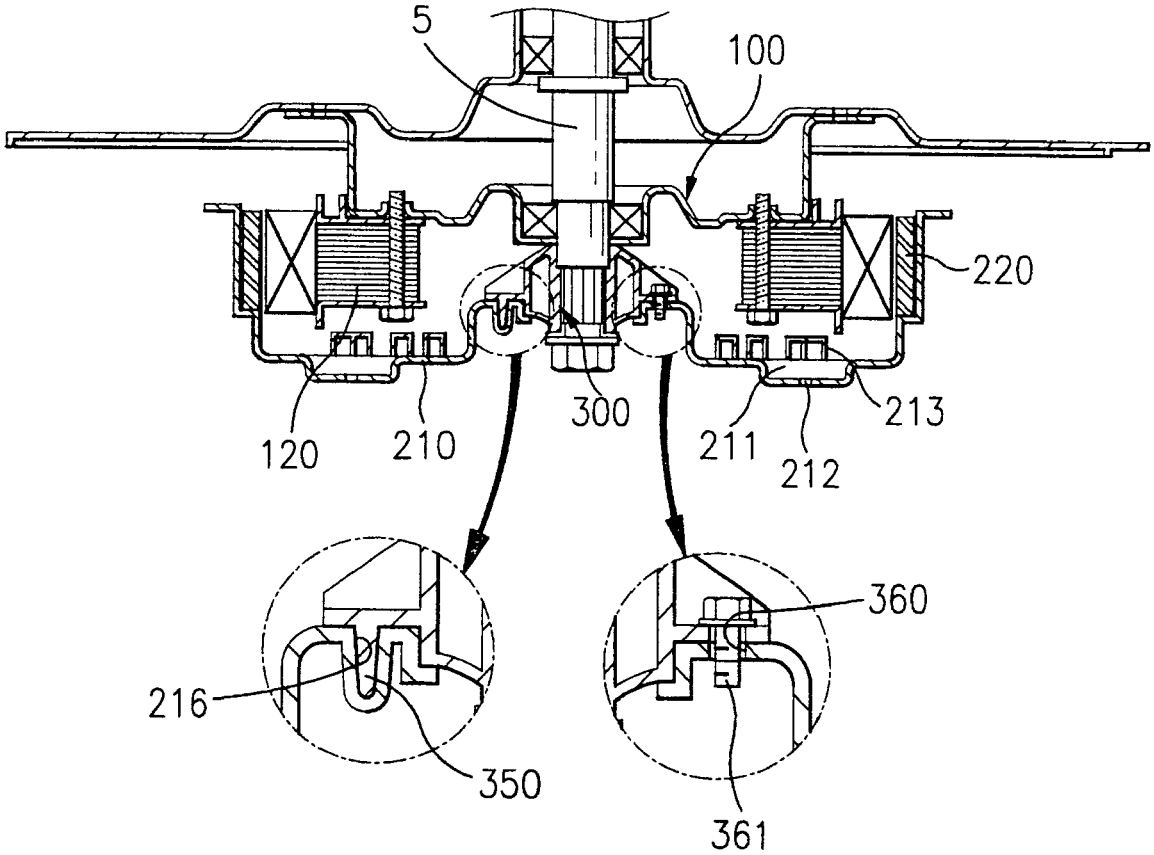

However, the present invention suggests a system as illustrated in FIG. 10 which is a combination of the system in FIG. 8 and the system in FIG. 9, for more exact and stable coupling between the support member 300 and the lower frame 210. There are a plurality of coupling projections 350 and coupling holes 360 along a bottom circumference of the support member in symmetry, so that, when it is intended to couple the support member 300 to the lower frame 210, the support member 300 can be made to set on the lower frame 210 exactly as the coupling holes 216 guide the coupling projections 350, and, when the support member 300 and the lower frame 210 are brought into a close contact, the support member 300 and the lower frame 210 are fastened with bolts 361 or the like through the fastening holes 360, for making a stable fastening between the support member 300 and the lower frame 210. Eventually, the foregoing system provides a brushless motor having a section as illustrated in FIG. 11.

The brushless motor in a washing machine of the present invention has the following advantages as a material of the brushless motor is improved and various deficiencies resulted in following the change of material are supplemented.

Smooth hedt dissipation from the motor can be achieved, to prevent deterioration of a motor performance coming from the heat of the motor performance.

Smooth drainage of the washing water accumulated in the brushless motor can be achieved, to permit to prevent short circuit between the coil in the stator and the shaft in advance.

The easy and stable fitting of the magnets to the inside surface of the lower frame in the rotor shortens an overall fabrication process and time period.

It will be apparent to those skilled in the art that various modifications and variations can be made in the brushless motor in a washing machine of the present invention without departing from the spirit or scope of the invention. Thus, it is intended that the present invention cover the modifications and variations of this invention provided they come within the scope of the appended claims and their equivalents.

What is claimed is:

1. A brushless motor in a washing machine, comprising:

a stator having a coil, the stator coupled to an upper frame; and a rotor having a lower frame entirely formed of a metal to cover an outer circumference and a bottom of the stator, a plurality of magnets fitted to an inside wall of the lower frame at fixed intervals opposite to the coil of the stator, and a support member formed as a single piece with the lower frame at a central portion thereof and coupled to a washing water shaft for transmission of rotating force of the lower frame to the washing water shaft, wherein the lower frame includes a plurality of grooves formed in a bottom surface thereof at fixed intervals along an inside circumference of the bottom surface, each having a drain hole in a bottom of the groove.

2. The brushless motor as claimed in claim 1, wherein the lower frame further includes a cooling fin between the grooves in the lower frame for dissipation of heat from the stator.

3. The brushless motor as claimed in claim 1, wherein the lower frame further includes projections on an inside circumference of the lower frame for fixing intervals of the magnets.

4. The brushless motor as claimed in claim 1, wherein a bottom surface of the support member and a surface of the lower frame have a plurality of fastening holes for fastening the support member and the lower frame with fastening means.

5. The brushless motor as claimed in claim 4, wherein the fastening means comprise bolts or rivets.

6. The brushless motor as claimed in claim 1, wherein the rotor having the lower surface entirely formed of a metal and configured such that the outer circumference of the rotor covers the plurality of magnets fitted to an inside wall thereof serves as the yoke.

7. A brushless motor in a washing machine, comprising:

a stator having a coil, the stator coupled to an upper frame; and a rotor having a lower frame entirely formed of a metal to cover an outer circumference and a bottom of the stator, a plurality of magnets fitted to an inside wall of the lower frame at fixed intervals opposite to the coil of the stator, and a support member formed as a single piece with the lower frame at a central portion thereof and coupled to a washing water shaft for transmission of rotating force of the lower frame to the washing water shaft, wherein the lower frame includes a plurality of grooves formed in a bottom surface thereof at fixed intervals along an inside circumference of the bottom surface, each having a drain hole in a bottom of the groove, wherein the lower frame [her] *further* includes a cooling fin between the grooves in the lower frame for dissipation of heat from the stator, and wherein the cooling fin is formed by lancing the lower frame, which forms a hole which is used as a draft hole.

8. A brushless motor in a washing machine, comprising:

a stator having a coil, the stator coupled to an upper frame; and a rotor having a lower frame entirely formed of a metal to cover an outer circumference and a bottom of the stator, a plurality of magnets fitted to an inside wall of the lower frame at fixed intervals opposite to the coil of the stator, and a support member formed of a single material and as a separate piece from the lower frame, and configured to be attached to the lower frame at a central portion thereof and directly coupled to a washing water shaft for transmission of rotating force of the lower frame to the washing water shaft, wherein the support member is formed of an insulating material that insulates it from the lower frame, and includes:

a circular rib;

radial ribs and reinforcing ribs extending from a circumference of the circular rib for reinforcing the lower frame; and a female serration for coupling the support member with the shaft, wherein the support member includes a plurality of downward coupling projections on a bottom surface thereof, and the lower frame includes a plurality of coupling holes opposite to the coupling projections for accepting the coupling projections on the support member, for coupling the support member and the lower frame.

9. A brushless motor in a washing machine, comprising:

a stator having a coil, the stator coupled to an upper frame; and a rotor having a lower frame entirely formed of a metal to cover an outer circumference and a bottom of the stator, a plurality of magnets fitted to an inside wall of the lower frame at fixed intervals opposite to the coil of the stator, and a support member formed at a central portion of the lower frame coupled to a washing water shaft for transmission of rotating force of the lower frame to the washing water shaft, wherein the lower frame further includes a cooling fin between grooves in the lower frame for dissipation of heat from the stator and wherein the cooling fin is formed by lancing the lower frame which forms a hole which is used as a draft hole.

10. A brushless motor in a washing machine, comprising:

a stator having a coil, the stator coupled to an upper frame; and a rotor having a lower frame entirely formed of a metal to cover an outer circumference and a bottom of the stator, a plurality of magnets fitted to an inside wall of the lower frame at fixed intervals opposite to the coil of the stator, and a support member formed at a central portion of the lower frame coupled to a washing water shaft for transmission of rotating force of the lower frame to the washing water shaft, wherein the support member is formed of an insulating material that insulates it from the lower frame, and includes:

a circular rib;

radial ribs and reinforcing ribs extending from a circumference of the circular rib for reinforcing the lower frame; and a female serration for coupling the support member with the shaft, wherein the support member includes a plurality of downward coupling projections on a bottom surface thereof, and the lower frame includes a plurality of coupling holes opposite to the coupling projections for accepting the coupling projections on the support member, for coupling the support member and the lower frame.

11. A brushless motor in a washing machine, comprising:

a stator having a coil and coupled to an upper frame; and a rotor having a lower frame entirely formed of metal to cover an outer circumference and a bottom of the stator, and a plurality of magnets fitted to an inside wall of the lower frame at fixed intervals opposite to the coil of the stator, wherein the lower frame further includes a cooling fin formed as a single piece with the rotor for dissipation of heat from the stator and wherein the cooling fin is formed by lancing and bending the lower frame which forms a hole which is used as a draft hole.

12. The brushless motor as claimed in claim 11, wherein the rotor has a support member formed at a central portion of the lower frame adjacent to the washing water shaft, wherein the lower frame further includes a plurality of grooves formed in a bottom surface of the lower frame at fixed intervals along an inside circumference of the bottom surface.

13. A brushless motor in a washing machine, comprising:

a stator having a coil, and coupled to an upper frame; and a rotator having a lower frame entirely formed of a metal to cover an outer circumference and a bottom of the stator, and a plurality of magnets fitted to an inside wall of the lower frame at fixed intervals opposite to the coil of the stator, and a plurality of grooves formed in a bottom surface of the lower frame at fixed intervals along an inside circumference of the bottom surface, wherein the grooves are formed in a radial direction of the lower frame, wherein the grooves are formed by pressing the lower frame, and a drain hole provided in a bottom of at least one of the grooves.

*14. A motor for a washing machine, comprising:*

*a drive shaft;*

*a stator;*

*a rotor comprising a frame formed entirely of steel and configured to cover at least a portion of the stator, the rotor having a plurality of magnets positioned adjacent to a sidewall of the rotor and a bottom surface adjacent the sidewall, wherein a center portion of the rotor protrudes toward the stator and comprises a plurality of coupling holes and at least one fastening hole; and*

*a support member configured to connect the rotor to the drive shaft, wherein the support member comprises a plurality of fastening holes and at least one coupling projection configured to be inserted into a corresponding coupling hole of the rotor.*

*15. A motor for a washing machine, comprising:*

*a drive shaft;*

*a stator;*

*a rotor comprising a frame formed entirely of steel and configured to cover at least a portion of the stator, the rotor having a plurality of magnets positioned adjacent to a sidewall of the rotor and a bottom surface adjacent the sidewall, wherein a center portion of the rotor protrudes toward the stator and includes a central opening having a projecting lip; and*

*a support member configured to connect the rotor to the drive shaft and having an opening for receiving therein the drive shaft, wherein corresponding projections and recesses are formed on mating portions of the drive shaft and the opening of the support member, and wherein the projecting lip of the rotor is configured to bear against and support the support member.*

*16. The motor of claim 15, wherein the support member comprises at least one reinforcing rib.*

*17. The motor of claim 16, wherein the at least one reinforcing rib comprises at least one circular rib.*

*18. The motor of claim 15, wherein the projecting lip extends substantially perpendicular to the bottom surface of the rotor, and then curves inward.*

*19. A washing machine, comprising:*

*an outer tub;*

*an inner tub rotatably mounted within the outer tub; and*

*a motor comprising:*

*drive shaft connected to the inner tub;*

*a single stator comprising a coil; and*

*a rotor comprising a frame formed entirely of steel and configured to cover at least a portion of the stator and to be connected to the drive shaft, the rotor having a plurality of magnets positioned adjacent to a sidewall of the rotor, a bottom surface adjacent the sidewall, and a plurality of cooling fins configured to project from the bottom surface of the rotor, wherein the sidewall comprises an extending lip at an end of the sidewall opposite the bottom surface of the rotor, and wherein the lip comprises a first portion that extends substantially perpendicular to the sidewall of the rotor, and a second portion that extends substantially perpendicular to the first portion.*

* * * * *